United States Patent [19]

Sieber et al.

[11] 4,047,592

[45] Sept. 13, 1977

[54] SELF-DRIVEN UNDERWATER NOISEMAKING DEVICE

[75] Inventors: Charles W. Sieber, Sterling, Va.; Richard K. Knutson, Rockville; John W. Johnston, Suitland, both of Md.

[73] Assignee: The United States of America as represented by the Secretary of the Navy, Washington, D.C.

[21] Appl. No.: 724,808

[22] Filed: Sept. 20, 1976

[51] Int. Cl.² .................... G10K 10/00; B63G 7/08
[52] U.S. Cl. ............................. 181/142; 114/244; 116/27; 181/120; 340/3 T
[58] Field of Search .............. 340/3 T, 4 R, 5 R; 181/120, 142, 143; 114/244, 245; 116/27

[56] References Cited

U.S. PATENT DOCUMENTS

| 3,319,735 | 5/1967 | Hayes et al. | 340/3 T |
| 3,495,022 | 2/1970 | Koehl | 181/143 |
| 3,906,884 | 9/1975 | Gould | 114/244 |

Primary Examiner—Richard A. Farley
Attorney, Agent, or Firm—R. S. Sciascia; Q. E. Hodges

[57] ABSTRACT

An underwater noisemaking device that is self-driven for use in towed underwater acoustic minesweeping or as a decoy countermeasure device. It comprises a cambered and slotted disc mounted in a frame so as to be free to rotate about a horizontal, transverse axis within its plane when being towed or is in a flow stream. The disc auto-rotates rapidly causing intermittent cavitation, resulting in the emission of loud "clapping" acoustic noise. It may be incorporated into other towed underwater acoustic minesweeping and decoy devices.

6 Claims, 2 Drawing Figures

SELF-DRIVEN UNDERWATER NOISEMAKING DEVICE

The invention described herein may be manufactured and used by or for the Government of the United States of America for governmental purposes without the payment of any royalties thereon or therefor.

BACKGROUND OF THE INVENTION

This invention relates to underwater acoustic minesweeping and countermeasure decoy devices, and more particularly to a towable, self-driven, underwater noisemaking device.

Older existing and previous towed noisemakers, for use as decoys or in acoustic minesweeping, usually have been exceedingly heavy and included complex driving mechanisms not suitable for aircraft deployment and towing. Recent prior art development efforts have been expended for helicopter-towed mine countermeasures. These efforts have produced lighter-weight devices, but they still suffer from the mechanical complexity of the drive mechanism. Also some prior art devices extract the driving energy from the water flow by an axial impeller, which through gearing, drives a planar disc for noisemaking about a vertical axis. The mechanical transfer through gears, to this usual vertical-axis shaft, results in adverse rolling and yawing moments on these towed devices. These disadvantages result directly in severe operational problems in regard to gear trimming and aircraft operational safety.

SUMMARY OF THE INVENTION

Briefly, the instant invention overcomes the disadvantages of the prior art towed underwater noisemaker devices by providing a self-driven underwater noisemaker device that is reduced in size, complexity, weight, and cost. The noisemaker device may be used alone or in conjunction with other acoustic minesweeping and decoy devices. It comprises a cambered and slotted disc, which is essentially, an impeller rotating about an axis in its plane mounted in perhaps a ring-shaped frame. The self-driven impeller is caused to auto-rotate rapidly when being towed or is in a flow stream. This auto-rotation feature reduces the weight and complexity of the device and eliminates the problems associated with the prior art drive mechanisms. Because of the design of the cambered and slotted impeller disc, intermittent cavitation (alternate generation and collapse of vapor cavities behind the disc) occurs resulting in loud "clapping" noise (broadband) with a peak acoustic energy frequency concentrated at twice the rotational rate of the disc.

The primary advantage to be realized by the new device is the reduction in complexity and the attendant improvement in reliability. For instance, all the prior art associated shafting and gearing may be deleted; thus savings in fabrication, maintainance costs, and weight are realized from the elimination of the longitudinal and vertical shafts mounting the impellers which, in the prior art device, tend to produce the aforementioned rolling and yawing moments. These moments make hydrodynamic trimming of the device difficult, and thus add danger to the aircraft operation, usually a helicopter.

STATEMENT OF THE OBJECTS OF THE INVENTION

Accordingly, an object of the invention is to provide a new, improved, and efficient towed underwater noise making device.

Another object of the instant invention is to provide a towed self-driven underwater noisemaking device.

Still another object of the present invention is to provide a simple, reliable and lightweight towed underwater noisemaking device.

A further object of the present invention is to provide an easily trimmed towed underwater noisemaking device; lessening the dangers to the towing aircraft.

BRIEF DESCRIPTION OF THE DRAWINGS

Other objects, advantages, and novel features of the invention will become apparent from the following detailed description of the invention when considered in conjunction with the accompanying drawings wherein.

DESCRIPTION AND OPERATION OF THE PREFERRED EMBODIMENT

Figure 1:
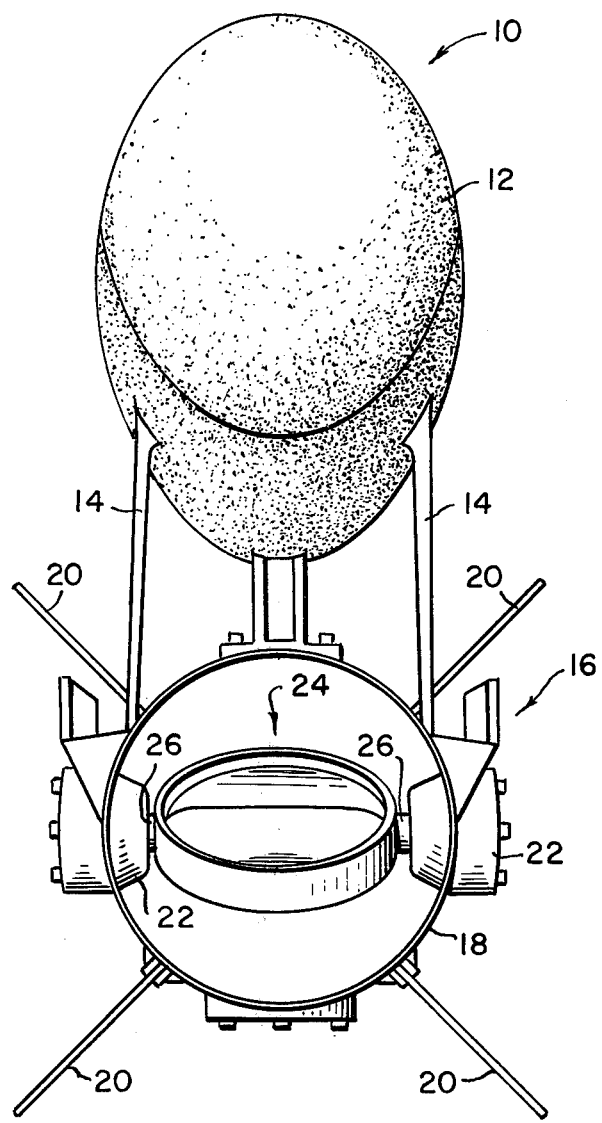
FIG. 1 is a front or bow pictorial view of a towed underwater noisemaking device associated with other towed devices.

Referring now to the drawings, there is shown in FIG. 1 is an example of a preferred embodiment generally, a towable device 10, comprising a hydrodynamically torpedo-shaped float body 12 (nose only shown) connected by brackets 14 to a noisemaking device 16. The float body 12 has a tow point (not shown) thereon, and may contain adjustable bouyancy devices therein, to maintain trim, stability, and towing depth of the noisemaking device. Further the float body may contain other underwater acoustic minesweeping and decoy devices therein (not shown).

The noisemaking device 16 includes a circular tube 18, directed bow to stern, parallel to the float body 12, and having radially extending stabilizing fins 20, shown in a cruciform pattern. Across the tube, in a horizontal transverse axis is a pair of coaxial bearing journals 22 secured to the tube. A circular disc 24, has diametrically opposed stub shafts 26 affixed to the edges of the disc. These stub shafts are mounted for rotation in the bearing journals 22. The disc 24 is thus free to rotate on a horizontal transverse axis in the disc's plane.

Figure 2:
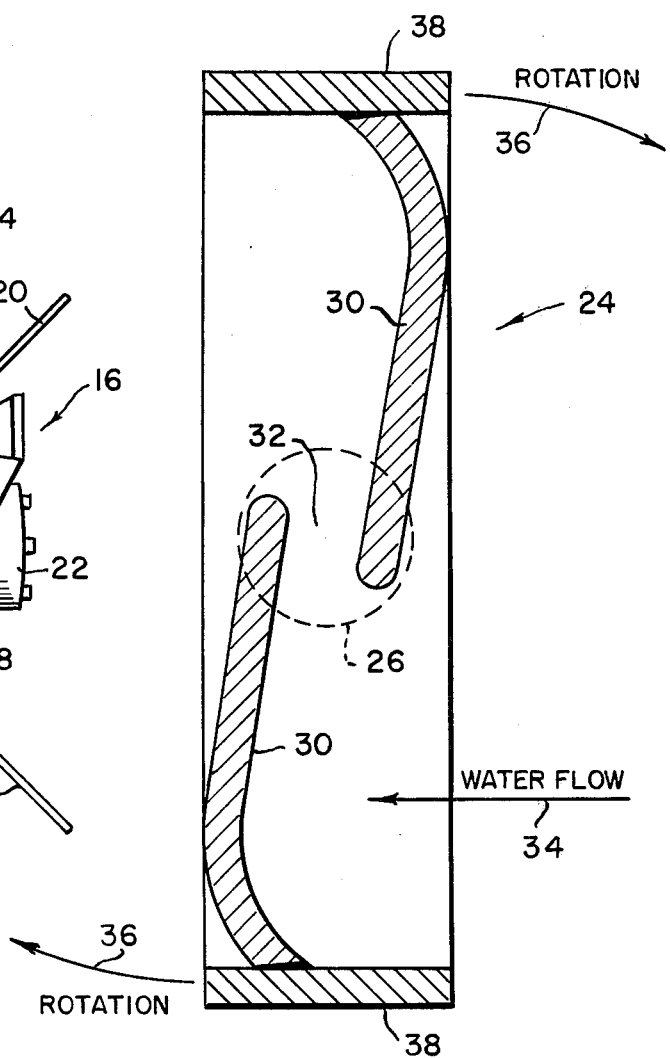
FIG. 2 is a cross-sectional view, taken along the rotational axis (into the paper), of the auto-rotating, noisemaking disc according to the invention.

Referring now to FIG. 2, the circular disc 24 is shown in detail for an understanding of how it auto-rotates. The cross-sectional view is taken along its axis of rotation about the stub shafts 26. The shafts 26 are affixed to the rim 28 of the disc 24, as for example by welding or any other feasible fastening means. A pair of cambered and basically semi-circular blades 30 are affixed to and comform to the inside surface of the rim 28, as, for example, by welding. The blades are affixed to the rim to provide their support so that their cambers are opposite each other, and form an open slot 32 in line with the stub shafts 26 from rim to rim. The axis of rotation is in the plane of the disc.

The operation of the self-driven, underwater noisemaking device will be explained hereinafter. Generally the self-driven underwater noisemaking device is towed, usually from an aircraft, preferably a helicopter. Therefore, the device 10 is deployed by lowering it through the air and into the water on a tow line attached to the towpoint. Obviously a water vehicle could deploy the device 10 from its stern but aircraft towing is more feasible. Once in the water, the device 10 assumes a streamlined attitude at a desired towing depth, due to the hydrodynamic, torpedo-shaped floatation body 12, the tube 18, and the fins 20. Further, the floatation body 12 will be directly above the noisemaking device 16 by virtue of its positive bouyancy. Thus the rotational axis of the disc 24 is maintained in a horizontal transverse position as the device is towed through the water.

Referring now to FIG. 2, the water flow, depicted by arrow 34, impinges on the lower (as shown) cambered blade 30, causing the disc 24 to auto-rotate as depicted by curved arrows 36 about the stub shafts 26 and therefore about an axis within the disc's plane. The waterflow continues through the slot 32 and impinges on the curved portion of the upper cambered blade 30 further aiding in disc's rotation about its plane. The lower blade becomes the upper one, and disc continues to "flip over" about the axis within the disc's plane and the horizontal transverse axis of the stub shafts 26. This "flip over" rotation, at sufficiently high towing speeds, results in the alternate generation and collapse of vapor cavities (cavitation) behind the disc which results in a loud "clapping" noise being emitted. The noise is broadband, but has a peak acoustic energy concentrated at a frequency twice the auto-rotational rate of the disc. Thus the self-driven noisemaking device may be used as a minesweeping device or a countermeasure decoy device. Also it is likely that the disc, rotating about the horizontal transverse axis in its own plane, will produce a vertical force, which if directed downward will assist in achieving the desired towing depth. This downward force would occur by rotating the disc in the "top-edge-forward" sense as shown.

Obviously, many modifications and variations of the present invention are possible in light of the above teachings. It is therefore to be understood that within the scope of the appended claims, the invention may be practiced otherwise than as specifically described.

What is claimed is:

1. A towable, self-driven, underwater noisemaking device, comprising:
    an underwater towable body device for connection to a tow cable from a vehicle; and
    auto-rotational disc cavitation means rotating about an axis within said disc's plane and attached for rotation to said towable body device.

2. The device of claim 1 wherein said auto-rotational disc cavitation means, comprises:
    a disc having a pair of cambered blades positioned opposite to each other with a slot therebetween.

3. The device of claim 2 wherein said slot is substantially in line with said axis of rotation.

4. The device of claim 3 wherein said pair of cambered blades further comprise:
    semicircular blades to form said disc means in a circular disc change;
    said cambers having bends in opposite direction to each other; and
    a circular rim affixed in supporting relationship around said semicircular blades.

5. The device of claim 4 wherein said rim has attached thereto:
    a pair of stub shafts on said axis of rotation in line with said slot; and
    a pair of coaxial bearing journals affixed to said body device on a horizontal transverse axis when said device is being towed, bearing said stub shafts for rotation.

6. The method of producing acoustical noise signal underwater comprising the steps of:
    mounting a diametrically split disc for self rotation when water flows through it; and
    towing the mounted disc through the water at sufficient speed to cause the rotating disc to cavitate intermittantly as the disc rotates to thereby produce a noise signal.

* * * * *